United States Patent [19]
Hashimoto et al.

[11] Patent Number: 4,613,944
[45] Date of Patent: Sep. 23, 1986

[54] ELECTRONIC TRANSLATOR HAVING REMOVABLE DATA MEMORY AND CONTROLLER BOTH CONNECTABLE TO ANY ONE OF TERMINALS

[75] Inventors: Shintaro Hashimoto, Ikoma; Masafumi Morimoto, Yamatokoriyama; Tosaku Nakanishi, Nara; Hideo Yoshida, Kashihara; Shigenobu Yanagiuchi, Tenri, all of Japan

[73] Assignee: Sharp Kabushiki Kaisha, Osaka, Japan

[21] Appl. No.: 296,125

[22] Filed: Aug. 25, 1981

[30] Foreign Application Priority Data

Aug. 29, 1980 [JP] Japan ............................ 55-120910

[51] Int. Cl.⁴ .......................................... G10L 5/00
[52] U.S. Cl. .................................. 364/513.5; 381/51
[58] Field of Search .................. 179/1.5 M; 364/710, 364/405, 513, 513.5

[56] References Cited

U.S. PATENT DOCUMENTS 4,060,848  11/1977  Hyatt .................................. 364/200
4,335,277  6/1982  Puri ................................... 179/1 SM

FOREIGN PATENT DOCUMENTS 2014765  8/1979  United Kingdom ............... 364/900

Primary Examiner—E. S. Matt Kemeny
Attorney, Agent, or Firm—Birch, Stewart, Kolasch & Birch

[57] ABSTRACT

An electronic translator comprising a first memory for providing signals representing a first word or words in a first language, a second memory for providing signals representing a second word or words in a second language, a first connector selectively occupied by at least one of the first and the second memories, a control device for processing the two types of signals, and carry out operations of the translator, and a second connector selectively occupied by the control device. Preferably, either of the first and the second memories is built into the body of the translator. A second control device may be built into the translator for processing the two types of signals and carrying out operations of the translator, in which case the two control devices are operable in the alternative to the exclusion of each other.

3 Claims, 6 Drawing Figures

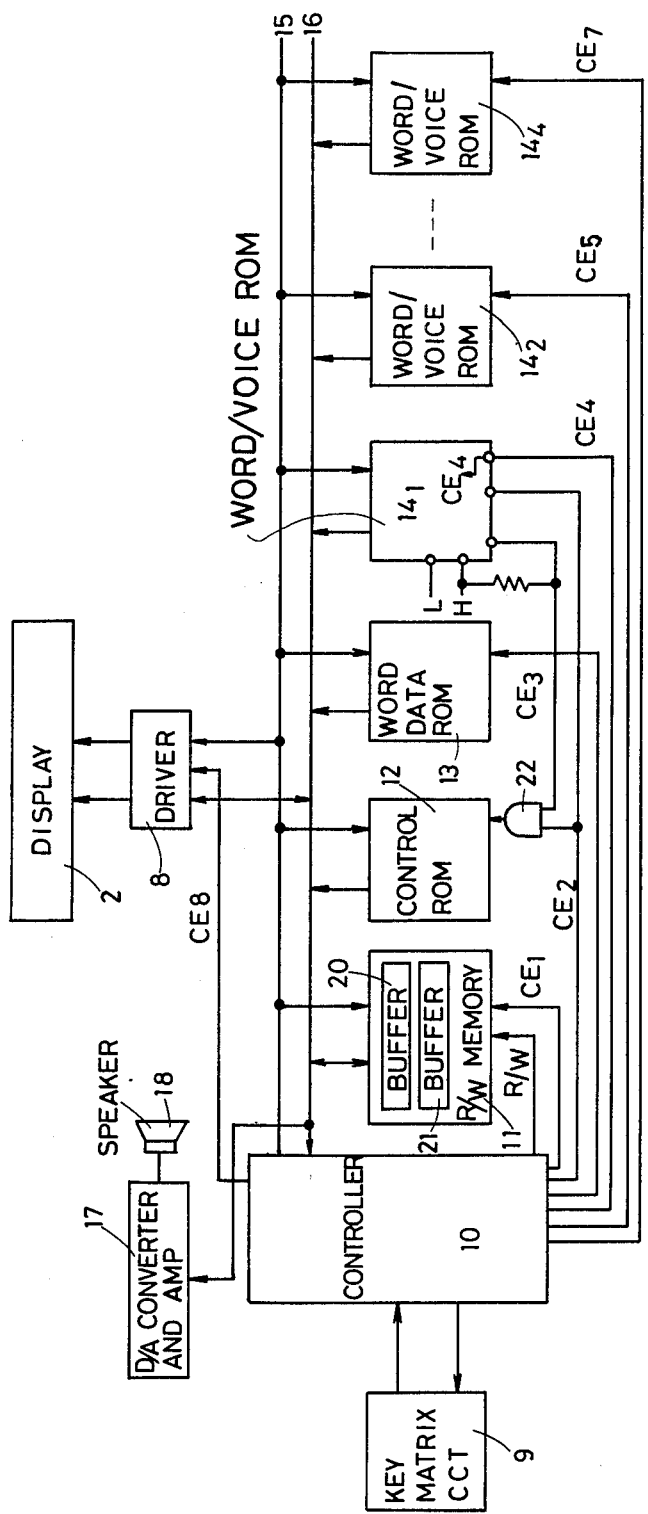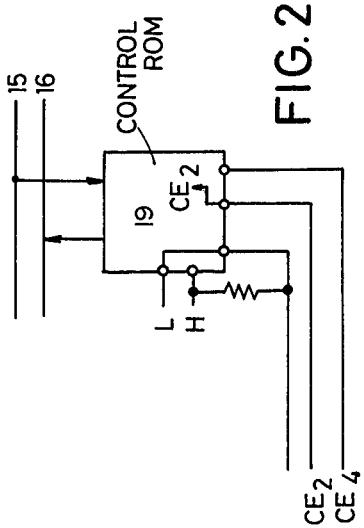
FIG.2(A)
FIG.2(B)

| LANGUAGE CODE (LC) | | | | | | | LANGUAGE |
|---|---|---|---|---|---|---|---|
| 0/1 | X | X | X | 0 | 0 | 0 | 1 | ENGLISH |
| 0/1 | X | X | X | 0 | 0 | 1 | 0 | GERMAN |
| 0/1 | X | X | X | 0 | 0 | 1 | 1 | JAPANESE |
| 0/1 | X | X | X | 0 | 1 | 0 | 0 | FRENCH |
| 0/1 | X | X | X | 0 | 1 | 0 | 1 | SPANISH |
| 0/1 | X | X | X | 0 | 1 | 1 | 0 | --- |
| 0/1 | X | X | X | 0 | 1 | 1 | 1 | --- |
| 0/1 | X | X | X | 1 | 0 | 0 | 0 | --- |
| 0/1 | X | X | X | 1 | 0 | 0 | 1 | --- |
| 0/1 | X | X | X | 1 | 0 | 1 | 0 | --- |
| 0/1 | X | X | X | 1 | 0 | 1 | 1 | --- |
| 0/1 | X | X | X | 1 | 1 | 0 | 0 | --- |
| 0/1 | X | X | X | 1 | 1 | 0 | 1 | --- |
| 0/1 | X | X | X | 1 | 1 | 1 | 0 | --- |

| FIELD CODE | FIELD |
|---|---|
| 0 0 0 | GENERAL |
| 0 0 1 | ENGINEERING |
| 0 1 0 | ECONOMY |
| 0 1 1 | LAW |
| 1 0 0 | --- |
| 1 0 1 | --- |
| 1 1 0 | --- |
| 1 1 1 | --- |

| | KIND OF ROM |
|---|---|
| 0 | FOR WORDS AND SENTENCES |
| 1 | FOR VOICE DATA |

ELECTRONIC TRANSLATOR HAVING REMOVABLE DATA MEMORY AND CONTROLLER BOTH CONNECTABLE TO ANY ONE OF TERMINALS

BACKGROUND OF THE INVENTION

The present invention relates in general to a word information storage and retrieval device and, more particularly, to an electronic translator for providing efficient and rapid retrieval of any desired word or words stored therein.

Recently, a new type of electronic device called an electronic translator has been available on the market. The electronic translator differs from any conventional type electronic devices in that it is of a unique structure which provides for efficient and rapid retrieval of word information stored in a memory.

The particular language processed in the electronic translator can be changed by changing the type of word data memory module. The word data memory module can memorize at least one kind of word data of Japanese, English, German, French, Spanish etc. Since a controller for controlling data retrieval from the word data memory module is conventionally built in the body of the translator, replacement of the voice memory module only changes the kind of language retrieved by the translator. However, the replacement heretofore could not improve and expand the retrieval operation of the language because it was impossible to change the controller.

Therefore, it is highly desired to improve the operation by the controller to expand the translator operation.

SUMMARY OF THE INVENTION

Accordingly, it is an object of the present invention to provide an improved electronic translator having a detachable controller for controlling data retrieval from a voice data memory.

It is another object of the present invention to provide an improved electronic translator for enabling an expansion of operation of the translator by detachably connecting controllers for data retrieval from a voice data memory to the translator. Briefly described, in accordance with the present invention, an electronic translator is characterized in that it comprises a first memory for providing signals representing first word or words in a first language, a second memory for providing signals representing a second word or words in a second language, a first connector selectively occupied by at least one of the first and the second memories, a control device for processing the two types of signals, and carrying out operations of the translator, and a second connector selectively occupied by the control device. Preferably, either of the first and the second memories is built in the body of the translator. A second control device may be built into the translator for processing the two types of signals and carrying out operations of the translator, in which case the operations using the two control devices are operable in the alternative to the exclusion of each other.

BRIEF DESCRIPTION OF THE DRAWINGS

The present invention will become more fully understood from the detailed description given hereinbelow and accompanying drawings which are given by way of illustration only, and thus are not limitative of the present unvention and wherein:

FIGS. 2(A), 2(B) and 3 show block diagrams of a control circuit implemented within the translator as shown in FIG. 1;

FIG. 5 shows a table for representing details of language codes used in the format of FIG. 4.

DESCRIPTION OF THE INVENTION

First of all, the translation of any kind of languages can be performed by the electronic translator of the present invention. An input word is spelled in a specific language to obtain an equivalent word, or a translated word spelled in a different language corresponding thereto. The kind of the languages to be translated can be freely selected.

Figure 1:
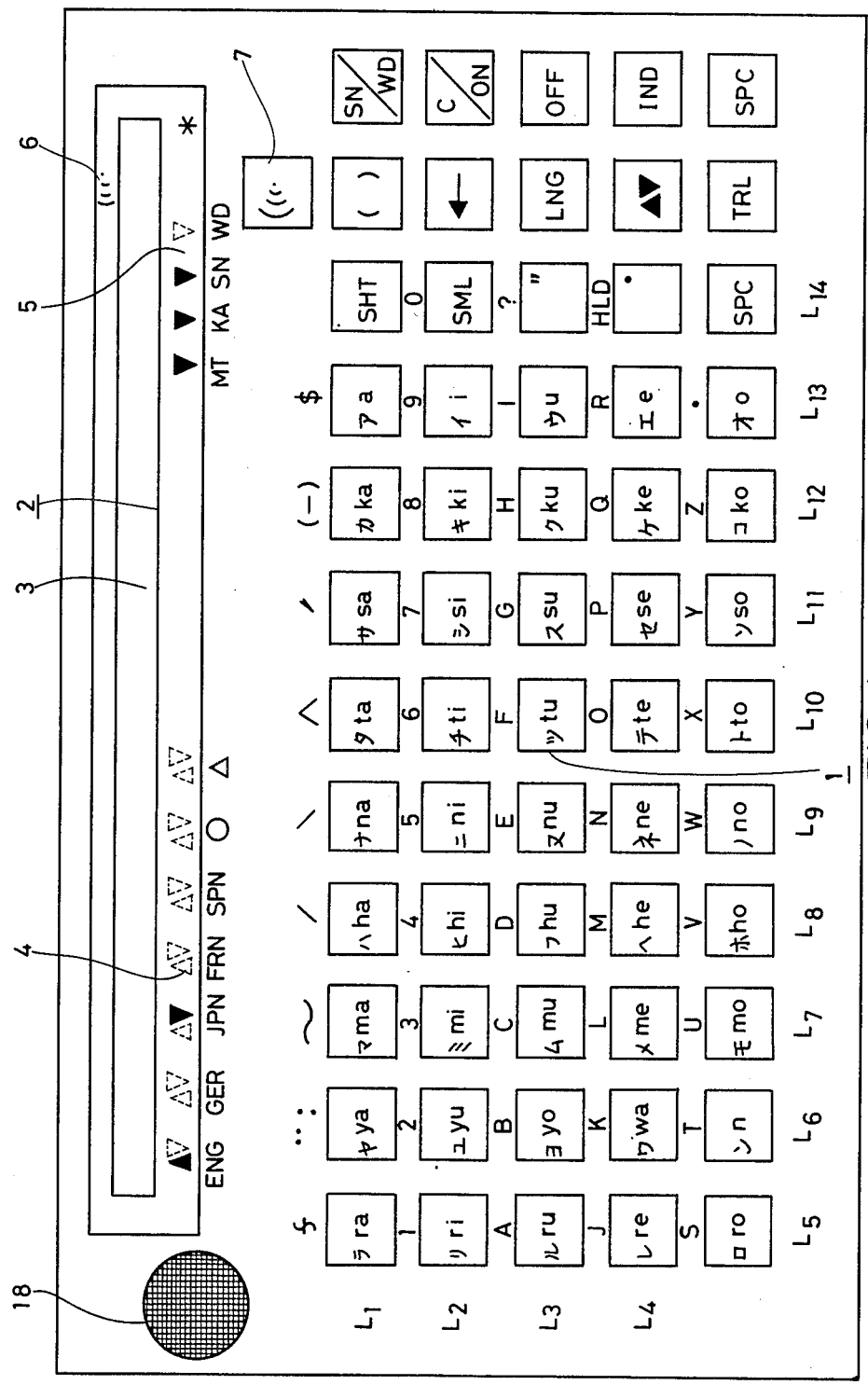
FIG. 1 shows a plan view of an electronic translator according to the present invetoin.

Referring now to FIG. 1, there is illustrated an electronic translator according to the present invention. The translator comprises a keyboard 1 containing a Japanese syllabery keyboard, an alphabetical keyboard, a symbol keyboard, a functional keyboard, an indicator 2 including a character indicator 3, a kind of tongue indicator 4 and a symbol indicator 5.

The character display 3 shows characters processed by this translator. The kind of tongue indicator 4 shows symbols used for representing the kind of the mother tongue and the foreign tongue processed by he translator. The symbol indicator 5 shows symbols used for indicating operated conditions in this translator. A symbol 6 is illuminated for showing that a word or sentence presently displayed in the character indicator 3 can be spoken out according to voice synthesization. A voice key 7 is provided for enabling voice generation of the word or sentence while the symbol 6 is illuminated. A speaker 18 is provided for generating voice with the voice synthesization.

FIG. 2(A) shows a block diagram of a control circuit implemented in the translator. The circuit comprises the display 2, a driver 8, a key matrix circuit 9, a controller or microcomputer 10, a read/write memory 11 comprising two buffers 20 and 21, a controlling ROM 12, a word data ROM 13, and word/voice data ROM modules $14_1$ to $14_4$.

The circuit 9 interfaces with the keyboard 1 of FIG. 1. The circuit 9 is connected to terminals of the microcomputer 10 for developing key strobe signals and key input signals. The read/write memory 11 comprises the buffer 20 for storing the number of words and/or sentences, and the buffers 21 for storing items of language codes in a selected foreign language. The language codes represent a specific kind of language and whether either the words and sentences data or voice data are memorized. The controlling ROM 12 is preferably built into the translator. The microcomputer 10 is responsive to the control by the controlling ROM 12 for processing the word, sentence, voice data. The word data ROM 13 stores information for words and sentences of a basic language, say, English. The word data ROM 13 is also preferably built into the body of the translator. Each of the word/voice data ROM modules $14_1$ to $14_4$ stores information for the words and the sentences and/or the voice data. Preferably, one of the modules $14_1$ to $14_4$ corresponds to one kind of language.

The ROM 13 can not be removed from the translator for exchange purposes. However each of the modules $14_1$ to $14_4$ can be removed from the translator and replaced by another type of module.

Each of the modules $14_1$ to $14_4$ is connected to the controller 10 through an address bus 15 and a data bus 16. Chip selection signals $CE_1$ to $CE_7$ are developed by the microcomputer 10 to select the ROMs 11, 12, 13 and $14_1$ to $14_4$. The information of the words and the sentences or the voice data is applied to the microcomputer 10 from the selected ROM. $CE_8$ indicates a chip selection signal data bus for the driver 8. R/W indicates a read/write selection signal data bus.

A D/A converter 17 is provided for enabling D/A conversion of the data on the data bus 16 so that the speaker 18 is operated to speak out any voice according to voice outputs synthesization. Each of the modules $14_1$ to $14_4$ is connected, in a detachable form, to the translation circuit. It may contain a plurality of various kinds of verbal information for words and/or sentences in a language. For description, four units of the modules are indicated in FIG. 2(A). The number of this type of module is not limited to four. While some of the modules $14_1$ to $14_4$ contain words or sentences in a digital code, some modules contain a great number of different kinds of verbal information in a digital code. A specific pronunciation is enabled by combining selected kinds of verbal information with access of the microcomputer 10 to such a module.

FIG. 2(B) shows a terminal circuit, of FIG. 2(A), to which a detachable module can be connected. Desirably, the module $14_1$ can be replaced by a controlling ROM module 19 as shown in FIG. 2(B). The terminals occupied by the module $14_1$ can be occupied by the controlling ROM module 19. The kind of the chip selection signal applied can be changed according to a circuit pattern on a wiring substrate of one module. To the module $14_1$ in FIG. 2(A), one kind of chip selection signal $CE_4$ is applied. To the module 19 in FIG. 2(B), another kind of chip selection signal $CE_2$ is applied.

While the word/voice data ROM module $14_1$ is connected, the controlling ROM 12 is selected under the condition that the chip selection signal $CE_2$ is generated, and the module $14_1$ is selected under the condition that the chip selection signal $CE_4$ is generated. The other input terminal to AND gate 22 different from the one receiving the chip selection signal $CE_2$ is kept pulled up to a high level.

On the other hand, if the controlling ROM module 19 replaces the module $14_1$, the other input terminal to the AND gate 22 is brought to a low level. The module 19 is selected under the condition that the chip selection signal $CE_2$ is generated. The built-in controlling ROM 12 is not selected. Therefore, generation of the chip selection signal $CE_4$ becomes meaningless.

Figure 3:
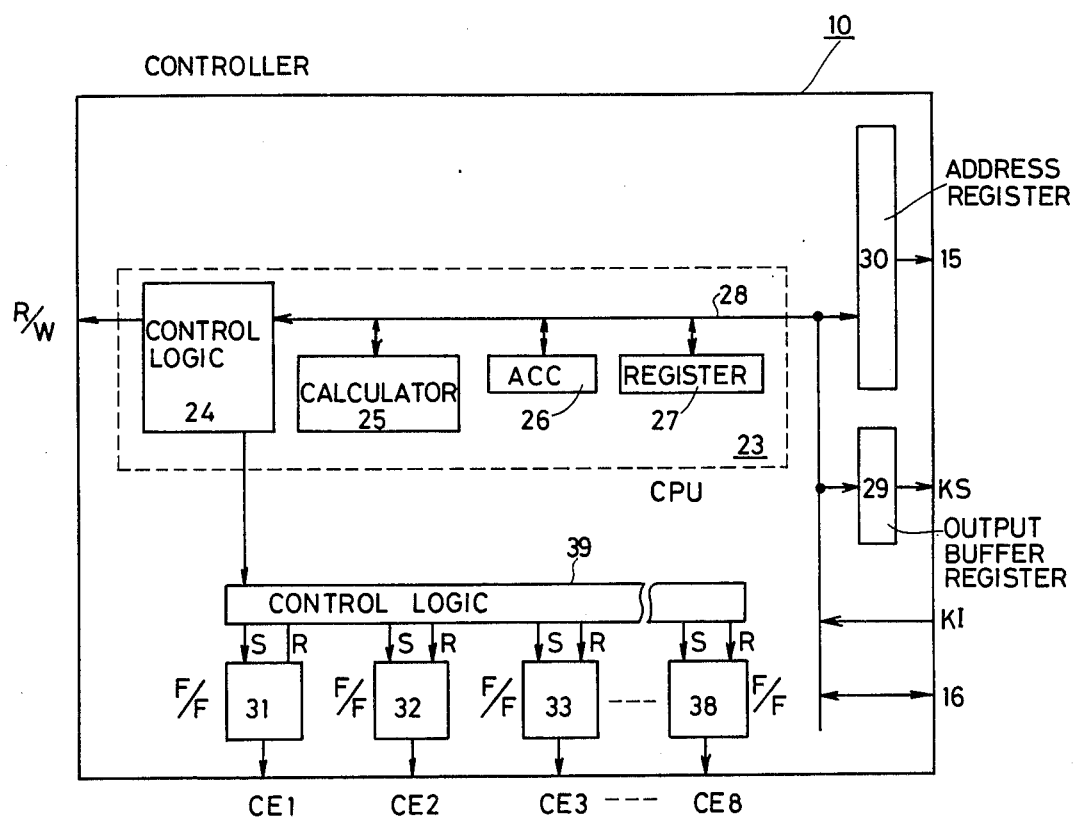

FIG. 3 shows a block diagram of the microcomputer 10 of FIG. 2(A). By subsequently the addressing address of the controlling ROM 12 or the controlling ROM module 19 using an address register, a great number of instructions may be developed. The great number of instruction are applied to a CPU 23. The CPU 23 decodes its instructions to provide its selected operation. The CPU 23 comprises a control logic 24, a logic calculator 25, an accumulator 26, and an additional register 27. An inner data bus is indicated by numeral 28.

Numeral 29 represents an output buffer register for outputting key strobe signals KS entered to the key matrix circuit 9 so that the output of this circuit 9 is applied to the CPU 23 as key input signals KI. Numeral 30 indicates an address register for selecting the address of the external memory including the ROMs 13 and $14_1$ to $14_4$. The output of the address register 30 is fed through the address bus 15. Control of the address register 30 to select, increment or decrement and a certain address is carried out by the CPU 23. Since the CPU 23 is coupled to the data bus 16 as shown in FIG. 2(A), transmission of the data between the CPU 23 and the external memory is held through the data bus 16. Direction of transmission of the data between them is defined with the read/write signal R/W.

Figure 4:
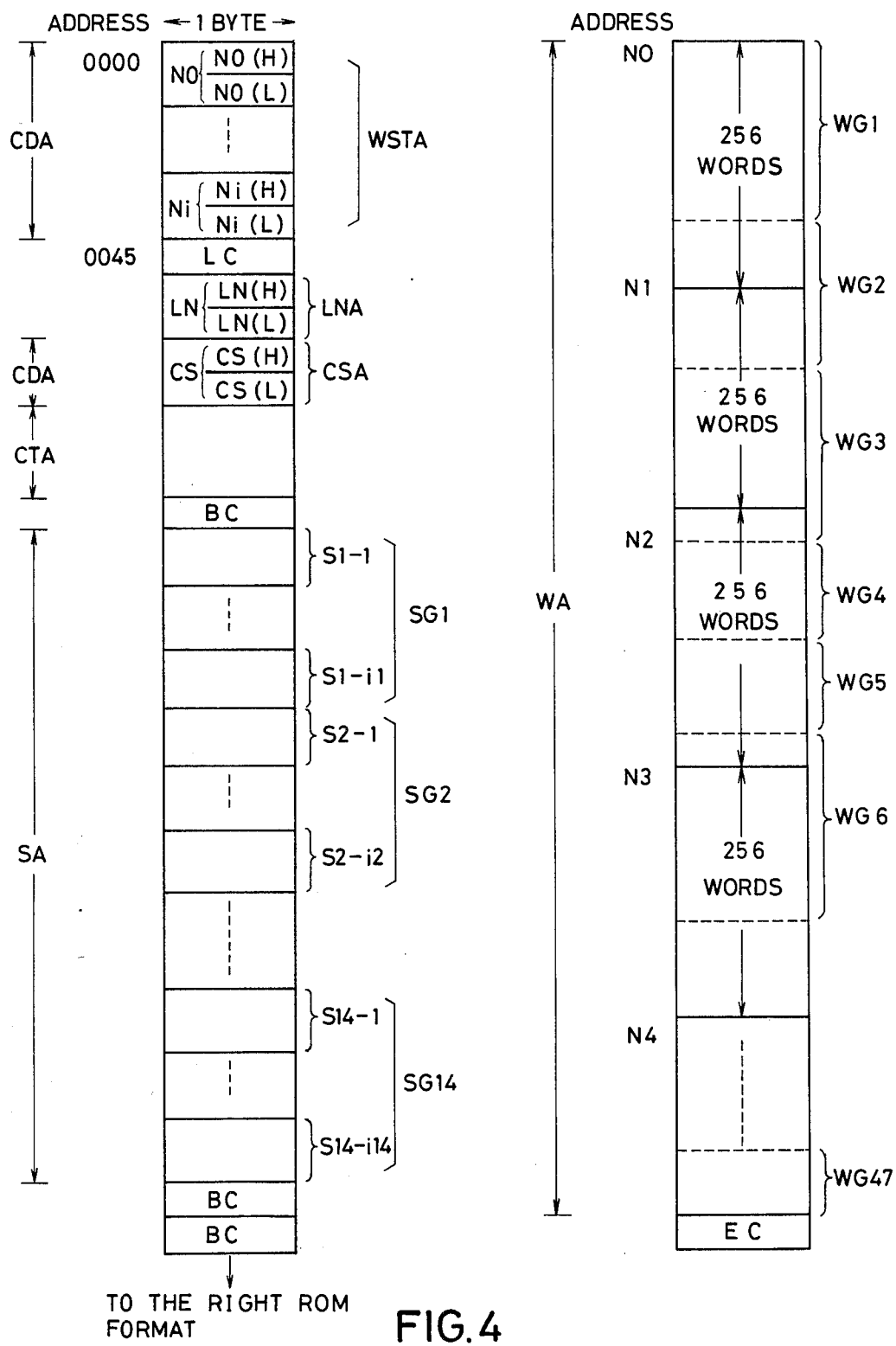
FIG. 4 shows a format of a ROM for memorizing words, the ROM being connectable to the circuit of FIG. 2(A)

Each of flip flop circuits 31 to 38 is set or reset by a control logic 39. The control logic 39 is controlled by the CPU 23. The output of each of the flip flop 31 to 38 is referred to the chip selection signals $CE_1$ to $CE_8$. FIG. 4 shows a format in which a great number of words are stored in each of the ROMs 13 and $14_1$ to $14_4$. This format contains a control data region CDA, a data-compression table CTA, a sentence data region SA and a word data region WA.

Each of the words is stored in the ROM such that its spelling is compressed. For example, in the ROM I 9, a pair of letters "AN" is stored as a compressed code of 1 byte, $CC_1$. Another pair of words "BA" is stored as a compressed code of 1 byte, $CC_2$. Frequency in occurrence of spelling of English words is determined to detect some English spelling having high frequency in occurrence. The thus selected English spelling is changed to corresponding compression codes for memorizing purposes. The data-compression table CTA stores data for presenting correspondence between the selected spelling and the compression codes.

When correspondence between input words and one or words memorized in one of the ROMs is to be detected, the input word is changed to codes inclusive of one of the compression codes according to the contents of the data-compression table CTA since each of the ROMs stores codes which may include one of the compression codes. The table CTA is used to show words stored in one of the ROMs by changing the codes to the original spelling. The type of this table is different depending on the kind of language to make the degree of data compression the greatest.

Stored words are classified in 47 categories in each of which a number of words are ordered. In FIG. 4, a word category n is referred to WGn. Sentences are formed by a combination of a plurality of stored words. These sentences are classified in 14 categories in each of which a number of sentences are ordered. In FIG. 4, a sentence category m is referred to SGm containing a first sentence $S_{m\text{-}1}$ to a last sentence $S_{m\text{-}im}$. Each of the categories belonging to each of the word categories WG1 to WG14 corresponds to each of the sentence categories SG1 to SG14.

The following table shows a relation between the serial number of the category and the name of the category.

| The serial number of the category | Corresponding key | The name of the category |
| --- | --- | --- |
| 1 | "ra" or "ç" | airplane |
| 2 | "ri" or "I" | customs |
| 3 | "ru" or "A" | transporting machine |
| 4 | "re" or "J" | at hotel | continued

| The serial number of the category | Corresponding key | The name of the category |
|---|---|---|
| 5 | "ro" or "S" | in restaurant |
| 6 | "m" or "T" | sight seeing |
| 7 | "mo" or "U" | amusement |
| 8 | "ho" or "V" | shopping |
| 9 | "no" or "W" | direction |
| 10 | "to" or "X" | business |
| 11 | "so" or "Y" | service |
| 12 | "ko" or "Z" | conversation |
| 13 | "O" or "." | at medical practitioner's Office |
| 14 | "SPC" or "o" | emergency |

Table 1-1

Each category for the words contains 256 words. A first word address table region WSTA contains a first address referred to $N_0, N_1, N_2, \ldots N_4$ in FIG. 4. This first address is related to a location in which first codes or fist compressed codes for representing the first word is stored. In accordance with a specific example of the present invention, each address is represented with two bytes. Each first address is separated to an upper byte referred to No(H) to Ni(H) and a lower byte referred to No(L) to Ni(L). The first word address table region is used to shorten retrieval time for a specific word.

CS is referred to a first sentence address CS(H) and CS(L) which is stored in a first sentence address region CSA. LNA indicates a memory location for storing a serial number of a word indicating the kind of a specific tongue as referred to LN of LN(H) and LN(L). More particularly, as the ROM storing English words in concerned, a word "English" is necessarily contained in that ROM. In such a case, the serial number of the word "English" in the ROM in LN starting from the first word of the same kind of word group. Memorizing the serial number LN is suitable for showing the kind of the mother tongue and the foreign tongue being selected on the character indicator 3 because it is unnecessary to additionally memorize a word showing the kind of tongue.

The translator of the present invention may comprise audible sound generating means for developing words represented in the mother tongue and/or the foreign tongue. Since such an audible sound genrating means is disclosed in, for example, Hyatt U.S. Pat. No. 4,060,848 issued Nov. 29, 1979, further description is omitted.

In FIG. 4, BC, "11111111" is a boundary code and EC "11111111" is an end code of the ROM. FIG. 5 shows a table for representing a tongue code LC. The tongue code LC comprises 8 bits. Low order 4 bits indicate the kind of language stored in the ROM, 5 to 7 bits indicate a field of language stored in the ROM, and the highest bit indicates the kind of word and sentence data or voice data. "0" in the highest bit represents that the word and sentence data are stored while "1" in the same bit represents that the voice data are memorized.

The field of language relates to a group of words stored such as general, engineering, economy, and law etc.

[OPERATION OF THE TRANSLATOR]

(1) Display:
With reference to FIG. 1, the letter indicator 3 displays alphabets, Japanese "Katakana" letters, figures and symbols. The kind of tongue indicator 4 displays the marks "▲" and "▼". The symbol indicator 5 contains the symbols MT, KA, SN and WD specified with the symbol "▼", and the star "*". Indication of these symbols is enabled with control of the driver 8 by developing corresponding data from the microcomputer 10.

(2) Translation principle:
The system of FIG. 2 has the capability of translating two to four kinds of languages to one another. A specific type of ROM memorizes a great number of words and sentences as shown in FIG. 4. Each of the words and sentences corresponds to each of the translated words and translated sentences. This correspondence is assured by the number of words and sentences which are in common between the ROMs. More particularly, a specific sentence "GOOD MORNING." is assumed to be memorized as the 100th sentence in a ROM related to English.

A corresponding Japanese and translated word is stored in the 100th sentence in another type of ROM related to Japanese. A further corresponding German and translated word "GUTEN MORGEN." is stored in the 100th sentence in a further type of ROM related to German.

Silimarity can be applied in connection with words so that a specific word ordered in a serial number in a ROM corresponds to a translated word ordered in the serial number in another type of ROM.

Conducting the translation by the translator depends on finding the serial number of a word or a sentence in the mother tongue ROM and, accordingly, in detecting a translated word or sentence having the serial number in the foreign tongue ROM.

The translation operation comprises the following steps:
(i) the first step: selecting a specific kind of ROM of the mother tongue
(ii) the second step: detecting the serial number of a word or a sentence in the thus selected ROM
(iii) the third step: selecting another specific kind of ROM of the foreign tongue, and
(iv) the fourth step: detecting a translated word or a translated sentence having the serial number in the another kind of ROM.

The invention being thus described, it will be obvious that the same may be varied in many ways. Such variations are not to be regarded as a departure from the spirit and scope of the invention, and all such modifications are intended to be included within the scope of the following claims.

What is claimed is:
1. An electronic translator wherein a first word or words represented in a first language are entered to obtain a second word or words represented in a second language equivalent to the first word or words, comprising:
first memory means for providing signals representing the first word or words in the first language;
second membory means for providing signals representing the second word or words in the second language;
first control ROM means for processing the signals from the first and second memory means and operating the electronic translator, said first control ROM means being built into said translator;
second control ROM means for processing said signals from said first and second memory means and operating the electronic translator as a substitute for said first control ROM means, said second con- trol ROM means being insertable and removable from operative association with said first and second memory means; and circuit means for inhibiting the operation of said first control ROM means when said second control ROM means is inserted into operative association with said first and second memory means.

2. The translator of claim 1, wherein said second memory means comprises a plurality of replaceable memory modules for storing word data related to said second language and said second control ROM is inserted in place of a selected one of said replaceable memory modules.

3. The translator of claim 2, wherein said replaceable memory modules are ROMs.

* * * * *